(12) United States Patent
Royer

(10) Patent No.: US 9,150,086 B1
(45) Date of Patent: Oct. 6, 2015

(54) TARPAULIN RETRACTION AND EXTENSION DEVICE

(71) Applicant: Real Royer, Saint-Hyacinthe (CA)

(72) Inventor: Real Royer, Saint-Hyacinthe (CA)

( * ) Notice: Subject to any disclaimer, the term of this patent is extended or adjusted under 35 U.S.C. 154(b) by 1 day.

(21) Appl. No.: 14/301,809

(22) Filed: Jun. 11, 2014

Related U.S. Application Data

(63) Continuation-in-part of application No. 14/264,232, filed on Apr. 29, 2014, now abandoned.

(51) Int. Cl.
*B60J 11/00* (2006.01)
*B60J 7/08* (2006.01)
*B62D 33/04* (2006.01)

(52) U.S. Cl.
CPC *B60J 7/085* (2013.01); *B62D 33/04* (2013.01)

(58) Field of Classification Search
CPC .................................. B60J 7/085; B62D 33/04
See application file for complete search history.

(56) References Cited

U.S. PATENT DOCUMENTS

| | | | |
|---|---|---|---|
| 473,292 A | 4/1892 | Campbell et al. |
| 1,318,820 A | 10/1919 | Watkins |
| 1,784,248 A | 12/1930 | Nolen et al. |
| 1,786,048 A | 12/1930 | Williams |
| 2,562,300 A | 7/1951 | Dingman |
| 2,976,082 A | 3/1961 | Dahlman |
| 2,997,967 A | 8/1961 | Malapert |
| 3,366,414 A | 1/1968 | Thompson et al. |
| 3,384,413 A | 5/1968 | Sargent |
| 3,423,126 A | 1/1969 | Galvin et al. |
| 3,768,540 A | 10/1973 | Mc Swain |
| 3,785,694 A | 1/1974 | Sargent |
| 3,829,154 A | 8/1974 | Becknell |
| 3,889,321 A | 6/1975 | Moser |
| 4,027,360 A | 6/1977 | Moser |
| 4,212,492 A | 7/1980 | Johnsen |
| 4,225,175 A | 9/1980 | Fredin |
| 4,234,224 A | 11/1980 | Rosenvold |
| 4,279,064 A | 7/1981 | Simme |
| 4,302,043 A | 11/1981 | Dimmer et al. |
| 4,369,009 A | 1/1983 | Fulford |
| 4,380,350 A | 4/1983 | Block |
| RE31,746 E | 11/1984 | Dimmer et al. |
| 4,484,732 A | 11/1984 | Gould |
| 4,484,777 A | 11/1984 | Michel |
| 4,505,512 A | 3/1985 | Schmeichel et al. |
| 4,518,193 A | 5/1985 | Heider et al. |
| 4,529,098 A | 7/1985 | Heider et al. |
| 4,657,062 A | 4/1987 | Tuerk |
| 4,659,134 A | 4/1987 | Johnson |
| 4,673,208 A | 6/1987 | Tsukamoto |
| 4,691,957 A | 9/1987 | Ellingson |

(Continued)

*Primary Examiner* — Lori L Lyjak

(57) ABSTRACT

A device for manipulating a tarpaulin so as to selectively cover and uncover a top aperture of a container, comprising: a guide mountable to the container along an aperture first side edge; a stopper positioned along the guide; a caddie mounted to the guide and movable therealong, the stopper being configured and sized for preventing movements of the caddie beyond the stopper; a tarpaulin rod support defining a pivot section and a tarpaulin rod supporting section spaced apart therefrom, the tarpaulin rod support being pivotally mounted to the caddie in the pivot section; a tarpaulin rod for rolling the tarpaulin therearound and unrolling the tarpaulin therefrom, the tarpaulin rod being rotatably mounted to the tarpaulin rod supporting section so as to be rotatable about a rod longitudinal axis thereof; and an actuator operatively coupled to the tarpaulin rod for selectively rotating the tarpaulin rod about the rod longitudinal axis.

20 Claims, 4 Drawing Sheets

(56) References Cited

U.S. PATENT DOCUMENTS

| | | |
|---|---|---|
| 4,700,985 A | 10/1987 | Whitehead |
| 4,834,445 A | 5/1989 | Odegaard |
| 4,858,984 A | 8/1989 | Weaver |
| 4,909,563 A | 3/1990 | Smith |
| 4,915,439 A | 4/1990 | Cramaro |
| 4,987,942 A | 1/1991 | Eriksson |
| 4,991,901 A | 2/1991 | Meekhof, Sr. et al. |
| 5,002,328 A | 3/1991 | Michel |
| 5,026,109 A | 6/1991 | Merlot, Jr. |
| 5,050,923 A | 9/1991 | Petelka |
| 5,086,908 A | 2/1992 | Gladish et al. |
| 5,174,625 A | 12/1992 | Gothier et al. |
| 5,179,991 A | 1/1993 | Haddad, Jr. |
| 5,180,203 A | 1/1993 | Goudy |
| 5,186,231 A | 2/1993 | Lewis |
| 5,211,440 A | 5/1993 | Cramaro |
| 5,253,914 A | 10/1993 | Biancale |
| 5,328,228 A | 7/1994 | Klassen |
| 5,429,403 A | 7/1995 | Brasher |
| 5,466,030 A | 11/1995 | Harris et al. |
| 5,540,475 A | 7/1996 | Kersting et al. |
| 5,542,734 A | 8/1996 | Burchett et al. |
| 5,549,347 A | 8/1996 | Anderson |
| 5,658,037 A | 8/1997 | Evans et al. |
| 5,690,377 A | 11/1997 | Denyer |
| 5,692,793 A | 12/1997 | Wilson |
| 5,697,663 A | 12/1997 | Chenowth |
| 5,762,002 A | 6/1998 | Dahlin et al. |
| 5,765,901 A | 6/1998 | Wilkens |
| 5,794,528 A | 8/1998 | Gronig et al. |
| 5,823,067 A | 10/1998 | Clarys et al. |
| 5,911,467 A | 6/1999 | Evans et al. |
| 5,924,758 A | 7/1999 | Dimmer et al. |
| 5,938,270 A | 8/1999 | Swanson et al. |
| 5,984,379 A | 11/1999 | Michel et al. |
| 6,135,534 A | 10/2000 | Schmeichel |
| 6,142,553 A | 11/2000 | Bodecker |
| 6,142,554 A | 11/2000 | Carroll et al. |
| 6,152,516 A | 11/2000 | Williams |
| 6,193,299 B1 | 2/2001 | Than |
| 6,199,935 B1 | 3/2001 | Waltz et al. |
| 6,206,449 B1 | 3/2001 | Searfoss |
| 6,234,562 B1 | 5/2001 | Henning |
| 6,318,790 B1 | 11/2001 | Henning |
| 6,322,041 B1 | 11/2001 | Schmeichel |
| 6,361,100 B1 | 3/2002 | Koester |
| 6,435,599 B2 | 8/2002 | Than |
| 6,478,361 B1 | 11/2002 | Wood |
| 6,513,856 B1 | 2/2003 | Swanson et al. |
| 6,527,331 B2 | 3/2003 | Searfoss |
| 6,595,594 B2 | 7/2003 | Royer |
| 6,655,726 B2 | 12/2003 | Bergeron |
| 6,715,817 B2 | 4/2004 | Nolan et al. |
| 6,779,828 B1 | 8/2004 | Poyntz |
| 6,783,168 B2 | 8/2004 | Searfoss |
| 6,805,395 B2 | 10/2004 | Royer |
| 6,886,879 B2 | 5/2005 | Nolan et al. |
| 6,905,161 B2 | 6/2005 | Fliege et al. |
| 6,926,337 B2 | 8/2005 | Poyntz |
| 7,189,042 B1 | 3/2007 | Schmit |
| 7,506,912 B2 | 3/2009 | Royer |
| 7,513,561 B2 | 4/2009 | Royer |
| 7,549,695 B2 | 6/2009 | Royer |
| 8,177,284 B1 | 5/2012 | Royer |
| 8,641,123 B1 | 2/2014 | Royer |
| 2002/0021018 A1 | 2/2002 | Royer |
| 2002/0043816 A1 | 4/2002 | Johnston |
| 2002/0109371 A1 | 8/2002 | Wheatley |
| 2002/0135199 A1 | 9/2002 | Hanning |
| 2003/0052506 A1 | 3/2003 | Royer |
| 2003/0090124 A1 | 5/2003 | Nolan |
| 2003/0190209 A1 | 10/2003 | Smith |
| 2004/0195858 A1 | 10/2004 | Martin |
| 2010/0230994 A1 | 9/2010 | Royer |
| 2010/0320798 A1 | 12/2010 | Huotari et al. |
| 2011/0254310 A1 | 10/2011 | Royer |

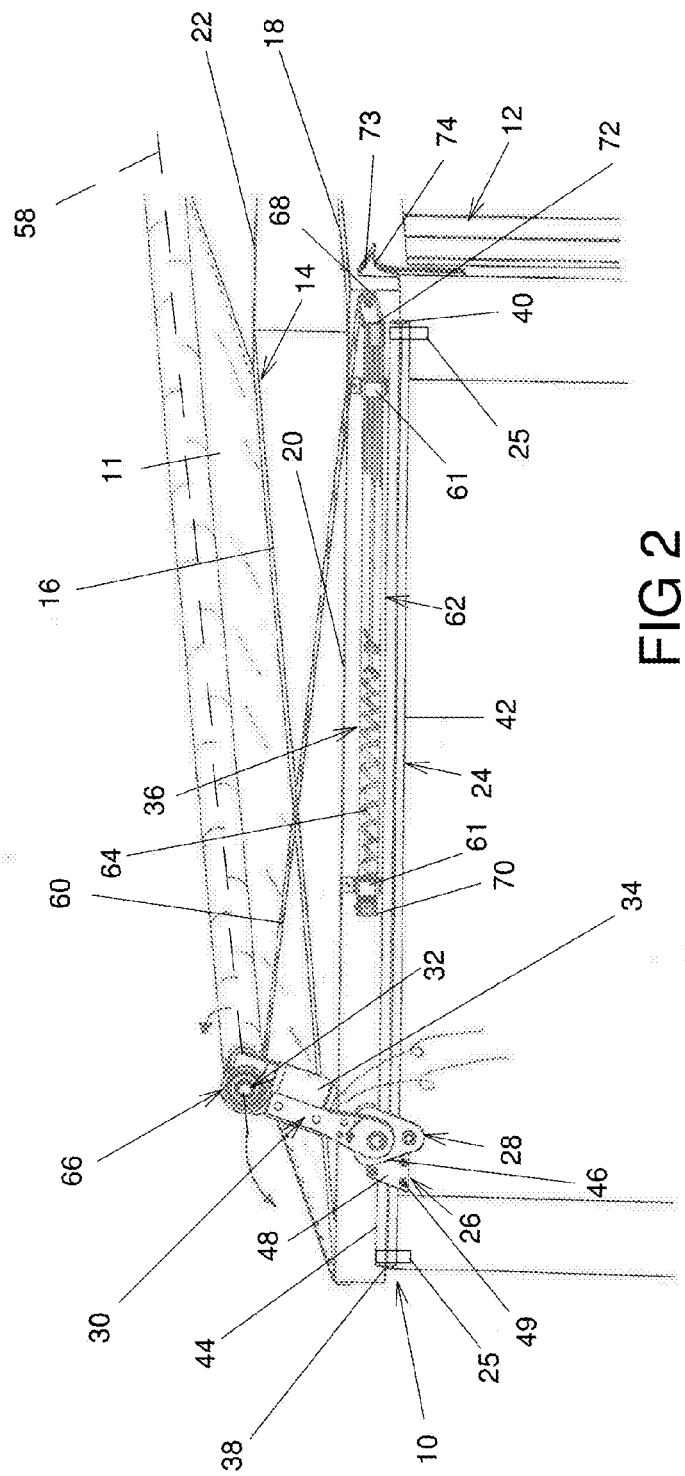
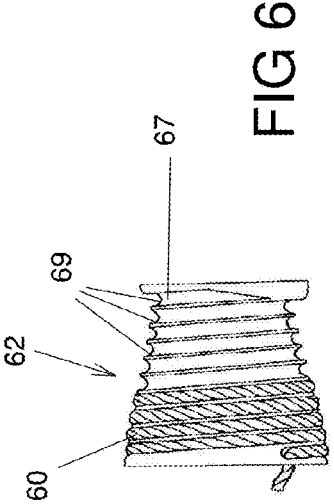
FIG 2
FIG 6

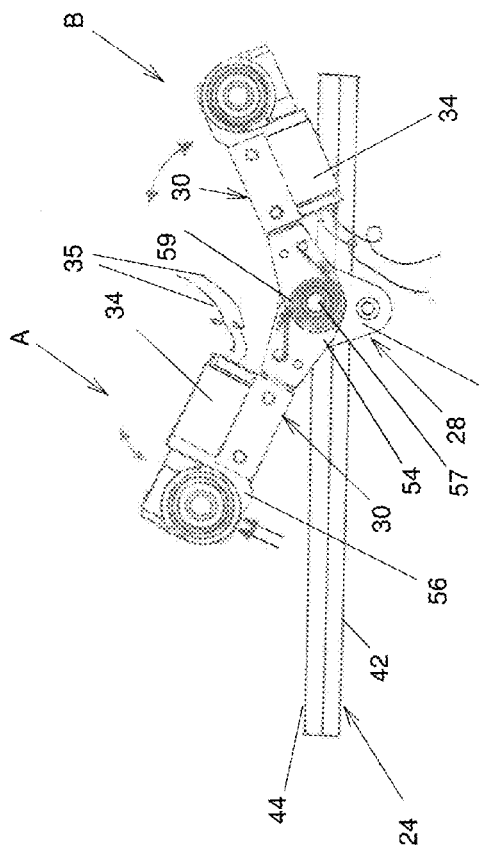
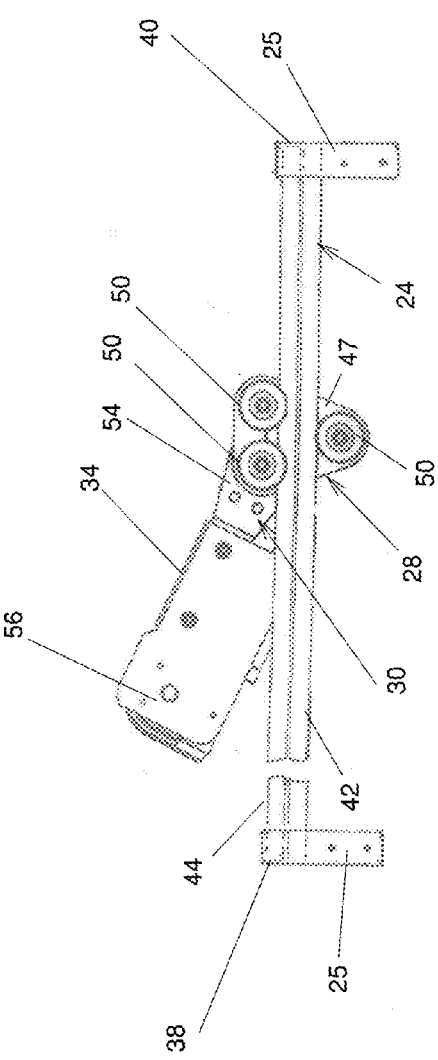
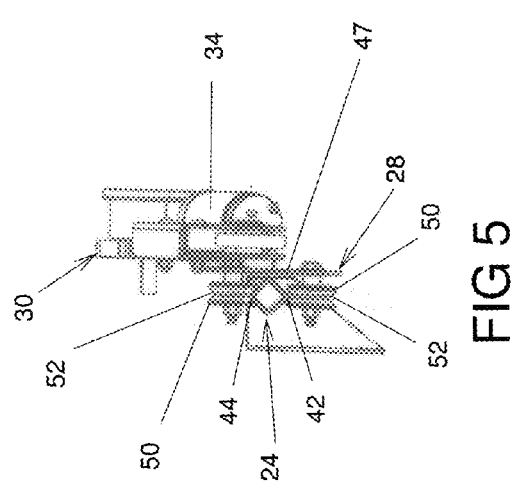

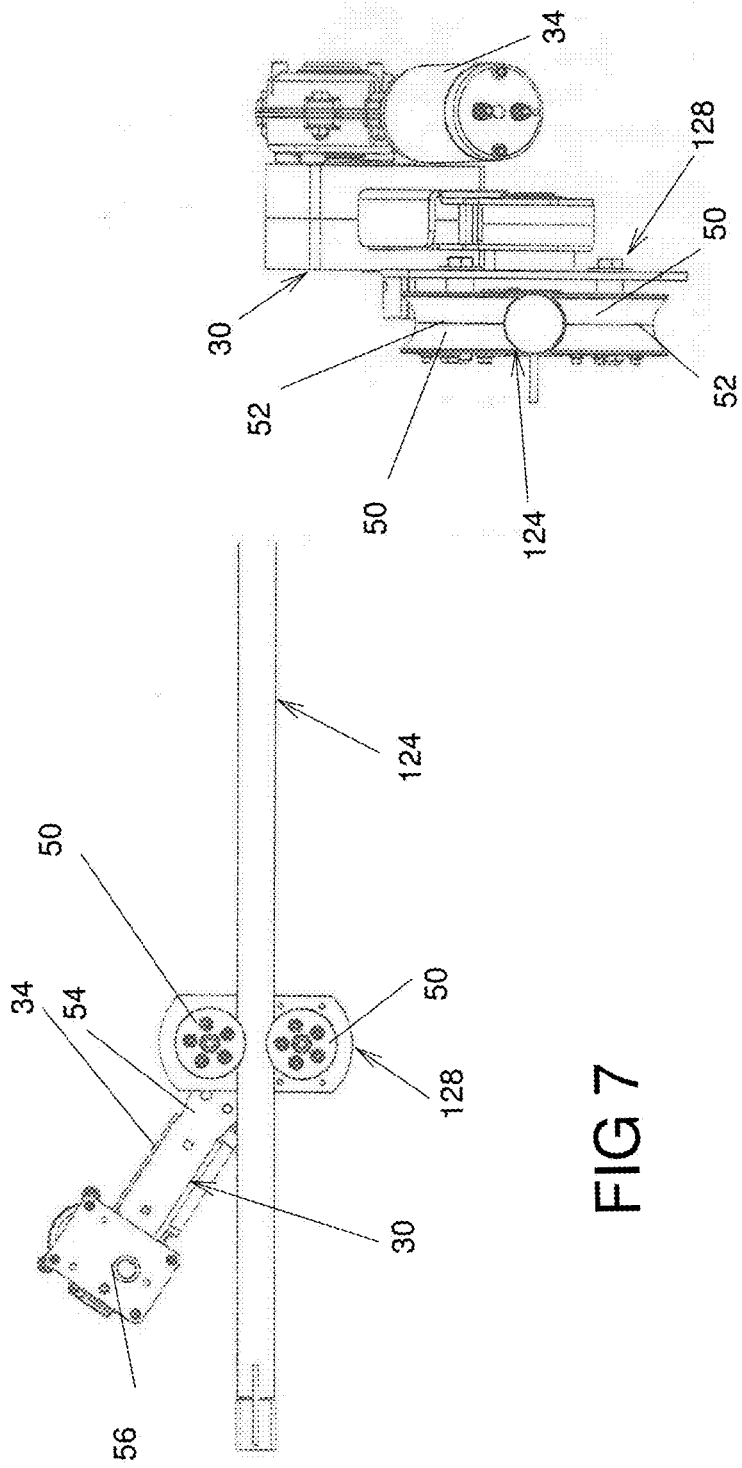

TARPAULIN RETRACTION AND EXTENSION DEVICE

FIELD OF THE INVENTION

The present invention relates generally to the field of transportation, and, more particularly, to a tarpaulin retraction and extension device usable with open top vehicle mounted containers.

BACKGROUND

There are many systems for covering top apertures of truck-movable containers, such as open top truck trailers and the bin of dump trucks. Many such systems conveniently roll a tarpaulin covering the top aperture around a rod when the top aperture is uncovered.

A disadvantage of many such systems is that they require relatively complex and/or heavy components to operate the rod, which adds costs to the systems. For example, many such systems have their rod, which is located on top of the container, rotated by an actuator that is located closer to the ground, for example adjacent the bottom part of the container.

Against this background, there exists a need for an improved tarpaulin extension and retraction device. An object of the present invention is to provide such a device.

SUMMARY OF THE INVENTION

In a broad aspect the invention provides a device for manipulating a tarpaulin so as to selectively cover and uncover a top aperture of a container, the top aperture defining substantially opposed aperture first and second end edges and substantially opposed aperture first and second side edges extending therebetween, the tarpaulin being configurable between an extended configuration and a retracted configuration, wherein, in the extended configuration, the tarpaulin substantially covers the top aperture, and in the retracted configuration, the tarpaulin is substantially retracted from the top aperture and substantially adjacent the aperture first end edge. The device includes a guide mountable to the container so as to extend along the aperture first side edge, the guide defining substantially opposed guide first and second ends located respectively substantially adjacent the aperture first and second end edges when the guide is operatively mounted to the container; a stopper positioned at a stopping location along the guide; a caddie mounted to the guide and movable therealong between the guide second end and the stopping location, the stopper being configured and sized for preventing movements of the caddie away from the guide second end beyond the stopping location; a tarpaulin rod support defining a pivot section and a tarpaulin rod supporting section spaced apart therefrom, the tarpaulin rod support being pivotally mounted to the caddie in the pivot section; a tarpaulin rod for rolling the tarpaulin therearound when configuring the tarpaulin from the extended configuration to the retracted configuration and for unrolling the tarpaulin therefrom when configuring the tarpaulin from the retracted configuration to the extended configuration, the tarpaulin rod defining a rod longitudinal axis, the tarpaulin rod being rotatably mounted to the tarpaulin rod support in the tarpaulin rod supporting section so as to be rotatable about the rod longitudinal axis, the rod longitudinal axis being substantially parallel to the aperture first end edge when the device is operatively mounted to the container; and an actuator operatively coupled to the tarpaulin rod for selectively rotating the tarpaulin rod about the rod longitudinal axis to selectively roll the tarpaulin therearound and unroll the tarpaulin therefrom to respectively move the tarpaulin to the retracted and extended configurations.

Typically, the device further comprises a tensioner biasing the tarpaulin rod toward the guide second end.

Typically, the tensioner includes a cable rollable around the tarpaulin rod, a tensioner body mountable to the container and a tensioner biasing element extending therebetween, the tensioner biasing element exerting a tension in the cable so that the cable pulls on the tarpaulin rod in a direction leading from the guide first end towards the guide second end, the cable being rolled around the tarpaulin rod when the tarpaulin is unrolled therefrom, and the cable being unrolled from the tarpaulin rod when the tarpaulin is rolled therearound. Typically, a pulley is mountable to the container for receiving the cable and redirecting the cable while allowing maintenance of the tension in the cable.

Typically, the tarpaulin rod includes a winch drum rotatable jointly therewith defining a drum external surface for receiving the cable thereonto and provided substantially adjacent the tarpaulin rod support, the winch drum having a generally frustro-conical configuration and being provided with an helicoidally-shaped winding groove formed on the drum external surface for substantially fittingly receiving the cable thereonto. In a specific embodiment of the invention, a sum of an unrolled tarpaulin length of the tarpaulin unrolled from the tarpaulin rod and an unrolled cable length of the cable unrolled from the tarpaulin rod remains substantially constant as the tarpaulin is moved between the extended and retracted configurations.

Typically, the tarpaulin rod support is pivotable between a rod support first position and a rod support second position, the tarpaulin rod support being between the caddie and respectively the guide first and second ends when respectively in the rod support first and second positions.

Typically, a rod support biasing element extends between the caddie and the tarpaulin rod support and biases the tarpaulin rod support toward the rod support second position when the tarpaulin rod support is away from the rod support second position.

In a variant, the rod support biasing element exerts substantially no biasing force between the caddie and the tarpaulin rod support when the tarpaulin rod support is in the rod support second position.

Typically, the caddie includes a caddie body and two wheels each rotatably mounted to the caddie body and rollable along the guide, the guide being received between the wheels so as to substantially prevent movements of the caddie perpendicular to the guide.

In a variant, the caddie includes a caddie body and at least two wheels each rotatably mounted to the caddie body and rollable along the guide, the guide being received between the wheels so as to substantially prevent movements of the caddie perpendicular to the guide.

Typically, the wheels are grooved wheels each defining a circumferential groove and the guide defines opposed edges received in the circumferential grooves.

Typically, the guide is substantially rectilinear.

Typically, the device further comprises an anchoring block mountable to the container substantially adjacent the aperture second end edge for receiving the tarpaulin rod when the tarpaulin is in the extended configuration.

Typically, the actuator includes a motor mounted to the tarpaulin rod support.

Typically, the stopping location is closer to the guide first end than to the guide second end.

In another broad aspect, the invention provides an assembly, comprising: a container defining a top aperture, the top aperture defining substantially opposed aperture first and second end edges and substantially opposed aperture first and second side edges extending therebetween; a tarpaulin configurable between an extended configuration and a retracted configuration, wherein, in the extended configuration, the tarpaulin substantially covers the top aperture, and in the retracted configuration, the tarpaulin is substantially retracted from the top aperture and substantially adjacent the aperture first end edge; and a device for manipulating the tarpaulin so as to selectively cover and uncover the top aperture. The device comprises: a guide mounted to the container so as to extend along the aperture first side edge, the guide defining substantially opposed guide first and second ends located respectively substantially adjacent the aperture first and second end edges; a stopper positioned at a stopping location along the guide; a caddie mounted to the guide and movable therealong between the guide second end and the stopping location, the stopper being configured and sized for preventing movements of the caddie away from the guide second end beyond the stopping location; a tarpaulin rod support defining a pivot section and a tarpaulin rod supporting section spaced apart therefrom, the tarpaulin rod support being pivotally mounted to the caddie in the pivot section; a tarpaulin rod for rolling the tarpaulin therearound when configuring the tarpaulin from the extended configuration to the retracted configuration and for unrolling the tarpaulin therefrom when configuring the tarpaulin from the retracted configuration to the extended configuration, the tarpaulin rod defining a rod longitudinal axis, the tarpaulin rod being rotatably mounted to the tarpaulin rod support in the tarpaulin rod supporting section so as to be rotatable about the rod longitudinal axis, the rod longitudinal axis being substantially parallel to the aperture first end edge; and an actuator operatively coupled to the tarpaulin rod for selectively rotating the tarpaulin rod about the rod longitudinal axis to selectively roll the tarpaulin therearound and unroll the tarpaulin therefrom to respectively move the tarpaulin to the retracted and extended configurations.

In some embodiments of the invention, the container is a vehicle container part of a road vehicle. The device mentioned in the above paragraph may also include all the particularities of the device mentioned hereinabove in the present summary of the invention.

In another broad aspect, the invention provides a device for manipulating a tarpaulin so as to selectively cover and uncover a top aperture of a container, the top aperture defining substantially opposed aperture first and second end edges and substantially opposed aperture first and second side edges extending therebetween, the tarpaulin being configurable between an extended configuration and a retracted configuration, wherein, in the extended configuration, the tarpaulin substantially covers the top aperture, and in the retracted configuration, the tarpaulin is substantially retracted from the top aperture and substantially adjacent the aperture first end edge, the device comprising: a guide mountable to the container so as to extend along the aperture first side edge, the guide defining substantially opposed guide first and second ends located respectively substantially adjacent the aperture first and second end edges when the guide is operatively mounted to the container; a caddie mounted to the guide and movable therealong between the guide first and second ends; a tarpaulin rod for rolling the tarpaulin therearound when configuring the tarpaulin from the extended configuration to the retracted configuration and for unrolling the tarpaulin therefrom when configuring the tarpaulin from the retracted configuration to the extended configuration, the tarpaulin rod defining a rod longitudinal axis, the tarpaulin rod being rotatably mounted to the caddie so as to be rotatable about the rod longitudinal axis, the rod longitudinal axis being substantially parallel to the aperture first end edge when the device is operatively mounted to the container; and an actuator operatively coupled to the tarpaulin rod for selectively rotating the tarpaulin rod about the rod longitudinal axis to selectively roll the tarpaulin therearound and unroll the tarpaulin therefrom to respectively move the tarpaulin to the retracted and extended configurations.

The device mentioned in the above paragraph may also include all the particularities of the device mentioned hereinabove in the present summary of the invention.

Advantageously, the proposed device can be manufactured using a relatively small quantity of materials as all the components thereof are provided adjacent the container aperture. Also, the actuator may be represented in some embodiments by a relatively small, and therefore relatively inexpensive, electric motor.

Other objects, advantages and features of the present invention will become more apparent upon reading of the following non-restrictive description of some embodiments thereof, given by way of example only with reference to the accompanying drawings.

BRIEF DESCRIPTION OF THE DRAWINGS

FIG. 2, in a partial perspective view, illustrates the container and device shown in FIG. 1, the tarpaulin being shown in a partially retracted configuration;

FIG. 3, in a first side elevation view, illustrates a guide (partially), a caddie and a tarpaulin rod support all part of the device shown in FIGS. 1 and 2, the tarpaulin rod support being shown in both rod support first and second positions alternatively achievable by the tarpaulin rod support;

FIG. 4, in a second side elevation view, illustrates the guide, caddie and tarpaulin rod support of FIG. 3;

FIG. 5, in a front elevation view, illustrates the guide, caddie and tarpaulin rod support of FIGS. 3 and 4;

FIG. 6, in a side elevation view, illustrates a winch drum part of a tarpaulin rod, the tarpaulin rod being part of the device shown in FIGS. 1 and 2;

FIG. 7, in a side elevation view, illustrates a guide, caddie and tarpaulin rod support that may replace the guide, caddie and tarpaulin rod support shown in FIG. 4 in alternative embodiments of the invention; and FIG. 8, in a front elevation view, illustrates the guide, caddie and tarpaulin rod support of FIG. 7.

DETAILED DESCRIPTION

Figure 1:
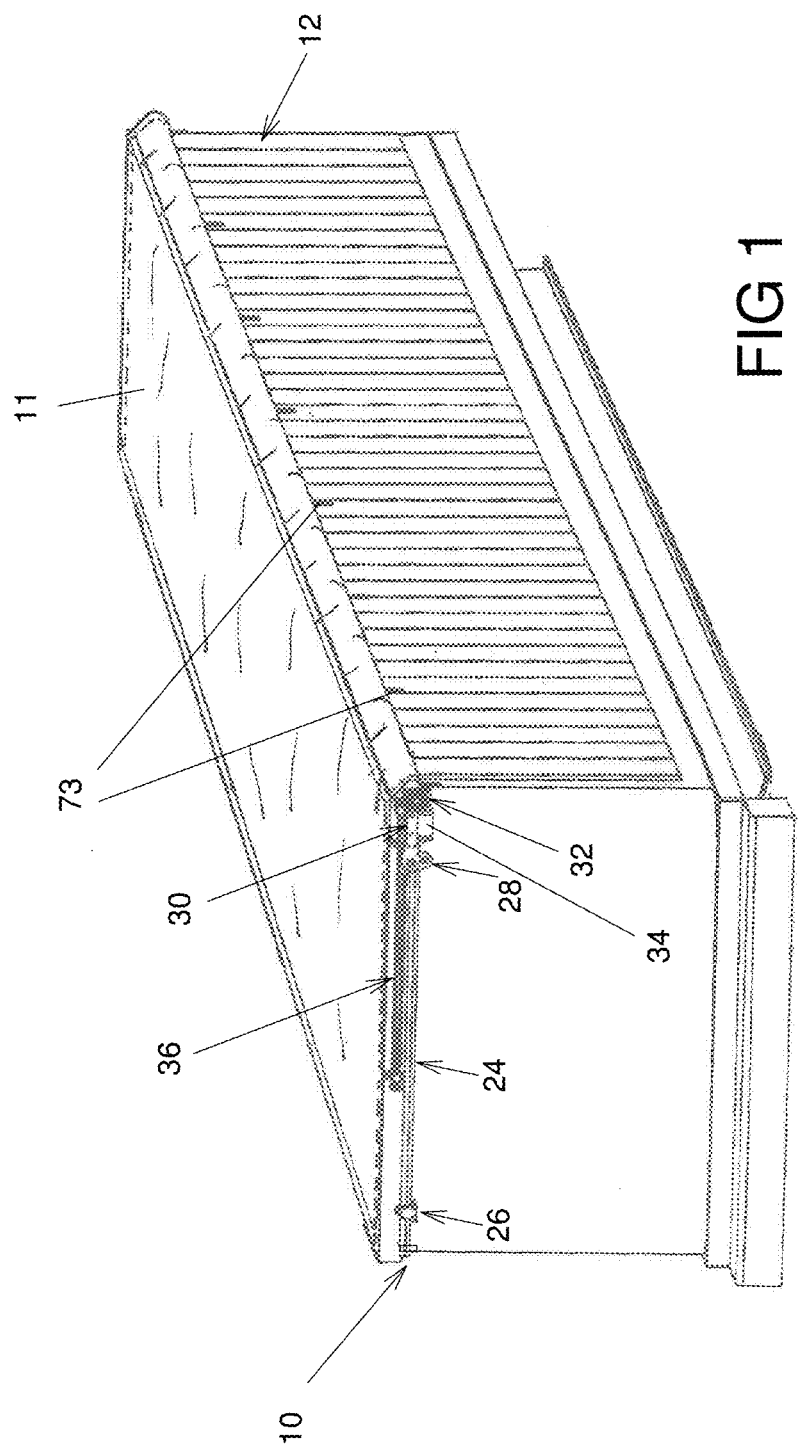
FIG. 1, in a perspective view, illustrates a container and a device for manipulating a tarpaulin in accordance with an embodiment of the present invention, the device being used to selectively cover and uncover a top aperture of the container, the tarpaulin being shown in an extended configuration.

Referring to FIG. 1, there is shown a device 10 for manipulating a tarpaulin 11. The device 10 is mountable to a container 12 so as to selectively cover and uncover a top aperture 14 thereof, as better seen in FIG. 2. Still referring to FIG. 2, the top aperture 14 defines substantially opposed aperture first and second end edges 16 and 18, which are typically parallel to each other, and substantially opposed aperture first and second side edges 20 and 22 extending therebetween, which are also typically parallel to each other. The tarpaulin 11 is configurable between an extended configuration (shown in FIG. 1) and a retracted configuration. FIG. 2 illustrates a partially retracted configuration in which the tarpaulin 11 is almost completely retracted to the retraced configuration. In the extended configuration, the tarpaulin 11 substantially covers the top aperture 14. In the retracted configuration, the tarpaulin 11 is substantially retracted from the top aperture 14 and substantially adjacent the aperture first end edge 16. The device 10 includes a guide 24, a stopper 26, a caddie 28, a tarpaulin rod support 30, a tarpaulin rod 32 and an actuator 34. In a typical embodiment, the device 10 also includes a tensioner 36.

The term "substantially" is used throughout this document to indicate variations in the thus qualifies terms. These variations are variations that do not materially affect the manner in which the invention works and can be due, for example, to uncertainty in manufacturing processes or to small deviations from a nominal value that do not cause significant changes to the invention. These variations are to be interpreted from the point of view of the person skilled in the art. Also, directional terminology such as below and horizontal, among others, is used in this document and refer to the device 10 and container 12 in a typical operational configuration. This terminology is used for clarity reasons and should not be used to restrict the scope of the appended claims unless explicitly mentioned in the claims.

It should be noted that FIG. 1 illustrates the device 10 mounted to a container 12 that is typically a vehicle mounted container, such as a container 12 mountable on a platform truck, an open top truck trailer or the bin of a dump truck. However, the device 10 is usable with other suitable containers 12. Also, in the context of a movable container 12, FIG. 1 illustrates a case in which the container is moved in a direction parallel to the container first and second end edges 16 and 18. The tarpaulin 11 is therefore retracted laterally relative to the direction of motion. However, it is within the scope of the invention to have tarpaulins 11 retractable along the direction of motion.

Referring to FIG. 2, the guide 24 is mountable to the container 12 so as to extend along the aperture first side edge 20, typically slightly below the aperture first side edge 20. The guide 24 defines substantially opposed guide first and second ends 38 and 40 located respectively substantially adjacent the aperture first and second end edges 16 and 18 when the guide 24 is operatively mounted to the container 12. The guide 24 is typically substantially rectilinear. For example, as better seen in FIG. 5, the guide 24 is an elongated tubular element of substantially square transversal cross-sectional configuration mounted obliquely so as to form a diamond shape when seen by an upstanding observer looking at the device 10 mounted in an operative configuration to the container 12. In this example, the guide 24 defines lower and upper edges 42 and 44, the purpose of which is better described hereinbelow. In alternative embodiments of the invention, the guide 24 may have any alternative shape. For example, and non-limitingly, as seen in FIG. 8, a guide 124 having a substantially circular transversal cross-sectional configuration may be used instead. The guide 24 is mounted to the container 12 in any suitable manner, for example using mounting brackets 25 provided adjacent the guide first and second ends 38 and 40 that mounted to the container 12 in any suitable manner, for example by being welded thereto or by using screws or nut and bolt combinations. The mounting brackets 25 each define a guide receiving recess snugly receiving a respective portion of the guide 24 thereinto.

Returning to FIG. 2, the stopper 26 is positioned at a stopping location 46 along the guide 24, the stopping location 46 being typically closer to the guide first end 38 than to the guide second end 40. For example, the stopper 26 includes a pair of plates 48 (only one of which is clearly seen in the drawings) provided on opposite sides of the guide 24 and secured to each other using for example nut and bolt combinations 49 extending each through both plates 48, with the plates 48 being compressed toward each other by the conventional bolt heads and the nuts. Tightening the nut and bolt combinations 49 secure the stopper 26 to the guide 24 as the guide 24 is then frictionally held fixed between the plates 48. It should be noted that loosening the nut and bolt combinations 49 allows moving the stopper 26 along the guide 24 during installation of the device 10 to provide an adjustment on the range of motion of the caddie 28.

The caddie 28 is mounted to the guide 24 and movable therealong between the guide second end 40 and the stopping location 46. The stopper 26 is configured and sized for preventing movements of the caddie 28 away from the guide second end 40 beyond the stopping location 46.

For example, as seen for example in FIG. 4, the caddie 28 includes a caddie body 47, which may be substantially plate-shaped and substantially parallel to the plates 48 of the stopper 26, and wheels 50 rollable along the guide 24 and rotatably mounted to the caddie body 47. The guide 24 is received between the wheels 50 so as to substantially prevent movements of the caddie 28 perpendicular to the guide 24.

More specifically, the caddie 28 includes at least two wheels 50 rollable along the guide 24, and in a specific embodiment of the invention, as shown in FIG. 4, exactly three wheels 50. For example, two wheels 50 are provided above the guide 24 and one wheel 50 is provided below the guide 24. The wheels 50 typically receive the guide 24 substantially snugly therebetween. For example, the wheels 50 are grooved, such as grooved pulleys, and each define a circumferential groove 52, seen in FIG. 5. The circumferential grooves 52 receive one of the lower and upper edges 42 and 44, which prevents horizontal movements of the caddie 28 perpendicular to the guide 24 and rotation of the caddie 28 about the longitudinal axis of the guide 24. In other embodiments, as seen in FIG. 8, only two wheels 50 are mounted to an alternative caddie 128. Also, in some embodiments, small lateral movements between the wheels 50 and the guide 24 are allowed. Preferably, these movements are smaller than the depth of the grooves 52. In yet other embodiments (not shown in the drawings), more than three wheels 50 are provided.

However, in alternative embodiments of the invention, the caddie body 47 has any other alternative shapes. In some alternative embodiments, the caddie 28 is slidable along the guide 24 instead of including wheels. In yet other embodiments, bearings are provided between the caddie 28 and the guide 24 to allow relative movements therebetween.

With reference to FIG. 3, the tarpaulin rod support 30 defines a pivot section 54 and a tarpaulin rod supporting section 56 spaced apart therefrom. The tarpaulin rod support 30 is pivotally mounted to the caddie 28 in the pivot section 54, for example using a pin 57. The tarpaulin rod support 30 is pivotable between a rod support first position, indicated by arrow A in FIG. 3, and a rod support second position, indicated by arrow B in FIG. 3. Therefore FIG. 3 does not illustrate a pair of tarpaulin rod supports 30, but the single tarpaulin rod support 30 positioned at two alternative positions. The tarpaulin rod support 30 is between the caddie 28 and respectively the guide first and second ends 38 and 40 when respectively in the rod support first and second positions.

Typically, a rod support biasing element 59, for example a spiral torsion spring rolled around the pin 57, extends between the caddie 28 and the tarpaulin rod support 30. The rod support biasing element 59 biases the tarpaulin rod support 30 toward the rod support second position when the tarpaulin rod support 30 is away from the rod support second position. Typically, the rod support biasing element 59 is configured so as to exert substantially no biasing force between the caddie 28 and the tarpaulin rod support 30 when the tarpaulin rod support 30 is in the rod support second position, and the biasing force tending to rotate the tarpaulin rod support 30 toward the rod support second position increases as the tarpaulin rod support 30 moves towards the rod support first position.

The tarpaulin rod 32 is provided for rolling the tarpaulin 11 therearound when configuring the tarpaulin 11 from the extended configuration to the retracted configuration and for unrolling the tarpaulin 11 therefrom when configuring the tarpaulin 11 from the retracted configuration to the extended configuration. The tarpaulin rod 32 defines a rod longitudinal axis 58 (seen in FIG. 2) and the tarpaulin rod 32 is rotatably mounted to the tarpaulin rod support 30 in the tarpaulin rod supporting section 56 so as to be rotatable about the rod longitudinal axis 58 in a conventional manner. The rod longitudinal axis 58 is substantially parallel to the aperture first and second end edges 16 and 18 when the device 10 is operatively mounted to the container 12.

The actuator 34 is operatively coupled to the tarpaulin rod 32 for selectively rotating the tarpaulin rod 32 about the rod longitudinal axis 58 to selectively roll the tarpaulin 11 therearound and unroll the tarpaulin 11 therefrom to respectively move the tarpaulin 11 to the retracted and extended configurations. For example, the actuator 34 is a motor mounted to the tarpaulin rod support 30 and coupled to the tarpaulin rod 32 using suitable transmission mechanisms, such as gears, to transmit the rotational motion of an output shaft of the motor to the tarpaulin rod 32. In some embodiments, the motor is an electric motor controlled using a controller (not shown in the drawings) connected therethrough through electrical wires 35.

Referring to FIG. 2, the tensioner 36 is used to provide tension in the device 10 so that when the tarpaulin 11 is unrolled from the tarpaulin rod 32, the tarpaulin rod 32 moves toward the aperture second end edge 18. Therefore, the tensioner 36 biases the tarpaulin rod 32 toward the guide second end 40 so that the tarpaulin rod 32 moves toward the guide second end 40 when the tarpaulin 11 is unrolled therefrom. This functionality could be achieved in other manners, for example by using the actuator 34, or another actuator, to move the caddie 28 in a suitable direction along the guide 24. The tensioner 36 is similar to a device having the same purpose and described in US Patent Application Publication No 2002/0021018 by Royer published In February 2002, the contents of which is hereby incorporated by reference in its entirety.

The tensioner 36 includes a cable 60 rollable around the tarpaulin rod 32, a tensioner body 62 (shown in cross-section in FIG. 2) mountable to the container 12 using suitable mounting brackets 61 and a tensioner biasing element 64 extending therebetween and exerting a tension in the cable 60 so that the cable 60 pulls on the tarpaulin rod 32 in a direction leading from the guide first end 38 towards the guide second end 40. The cable 60 is rolled around the tarpaulin rod 32 when the tarpaulin 11 is unrolled therefrom, and the cable 60 is unrolled from the tarpaulin rod 32 when the tarpaulin 11 is rolled therearound.

In some embodiments of the invention, the cable 60 is simply wound around the tarpaulin rod 32, which has then typically a substantially constant diameter therealong. In other embodiments, the tarpaulin rod 32 includes a winch drum 66 rotatable jointly therewith defining a drum external surface 67 for receiving the cable 60 thereonto, as seen in FIG. 6, and provided substantially adjacent the tarpaulin rod support 30. The winch drum 66 has a generally frustro-conical configuration and is provided with an helicoidally-shaped winding groove 69 formed on the drum external surface 67 for substantially fittingly receiving the cable 60 thereonto. The cable 60 has one end thereof fixed to the winch drum 66. In some embodiments, the tensioner 36 also includes another pulley 68 mountable to the container 12 for receiving the cable 60 and redirecting the cable 60 while allowing maintenance of the tension in the cable 60.

The tensioner body 62 is for example substantially elongated and defines substantially opposed tensioner body first and second ends 70 and 72. The tensioner body 62 may take for example the form of a substantially elongated tube receiving the tensioner biasing element 64 and part of the cable 60 thereinto. The tensioner body may for example be mountable to the container 12 along the aperture first side edge 20.

The tensioner biasing element 64 is for example a coil spring having one end thereof secured to the tensioner body 62 substantially adjacent the tensioner body first end 70 and the other end thereof secured to the cable 60. The pulley 68 is mounted to the tensioner body 62 substantially adjacent the tensioner body second end 72 so as to be substantially freely rotatable relative thereto. The tensioner body second end 72 is substantially adjacent the aperture second end edge 18.

The cable 60 extends from the tensioner biasing element 64 toward the tensioner body second end 72, loops around the pulley 68, and is partially rolled around the tarpaulin rod 32, either directly or around the winch drum 66. The cable 60 is mounted to the tarpaulin rod 32 so that a tension is maintained in the cable 60 by the tensioner biasing element 64. In some embodiments of the invention, for example through the use of a suitably configured winch drum 66, a sum of an unrolled tarpaulin length of the tarpaulin 11 unrolled from the tarpaulin rod 32 and an unrolled cable length of the cable 60 unrolled from the tarpaulin rod 32 remains substantially constant as the tarpaulin 11 is moved between the extended and retracted configurations. In turn, this ensures that the length of the tensioner biasing element 64 does not change as the tarpaulin is extended and retracted, which maintains a substantially constant tension in the cable 60. This is achieved by having a drum external surface 67 that has a slope such that when a length of tarpaulin 11 is unrolled from the tarpaulin rod 32, substantially the same length of cable 60 is rolled around the winch drum 67. The best match between the lengths of tarpaulin 11 and cable 60 rolled and unrolled is achieved when at any time, the outside diameter of the portion of the tarpaulin 11 that is rolled around the tarpaulin rod 32 is equal to the diameter of the winch drum 66 at the location at which the cable 60 enters the winding groove 69. In embodiments in which the winch drum 66 is not used, the tensioner biasing element 64 may change slightly in length to accommodate changes in the length of the cable 60 unrolled from the tarpaulin rod 32.

In some variants, the device 10 includes a pair of guides 24, stoppers 26, caddies 28 and tarpaulin rod supports 30, each provided on a respective side of the container 12. However, in other variants, the additional guide 24, stopper 26, caddie 28 and rod support 30 is not required.

In some embodiments of the invention, as seen in FIG. 1, the device 10 also includes at least one anchoring block 73, and typically a plurality of spaced apart anchoring blocks 73, mountable substantially adjacent the aperture second end edge 18 for receiving the tarpaulin rod 32 when the tarpaulin 11 is in the extended configuration. The anchoring blocks 73 are provided slightly below the aperture second end edge 18 and each define an inverted J-shaped recess 74, better seen in FIG. 2.

Operation of the device 10 is as follows. Taking for example as an initial configuration the extended configuration, the tarpaulin 11 extends across the top aperture 14 of the container 12. The tarpaulin rod 32 and any portion of the tarpaulin 11 that may remain rolled therearound are received in the recess 74 and tension in the tarpaulin 11 is maintained by the tensioner 36. The caddie 28 is at or substantially adjacent the guide second end 40 and the tarpaulin rod support 30 is in the rod support second position.

When an intended user wishes to retract the tarpaulin 11, the actuator 34 is used to rotate the tarpaulin rod 32 in a direction leading to the tarpaulin 11 being rolled therearound and the cable 60 to be unrolled therefrom. In turn, this rotational motion moves the caddie toward the stopper 26 as the tarpaulin rod 32 is pulled along the tarpaulin 11. The tensioner 36 and the rod support biasing element 59 maintain the tarpaulin rod support 30 in the rod support second position.

When enough of the tarpaulin 11 has been rolled around the tarpaulin rod 32, the caddie 28 reaches the stopper 26, which interferes with the movement of the caddie body 47 to stop the caddie 28 from moving when the caddie body 47 abuts against one of the plates 28. Further movement of the tarpaulin rod 32 to further roll the tarpaulin 11 therearound are then only possible if the tarpaulin rod support 30 pivots about the pin 57 toward the rod support first position, as seen in FIG. 2. Typically, the tarpaulin rod support 30 is configured and sized so that in the rod support first position, with the caddie 28 abutting against the stopper 26, the tarpaulin 11 is in the retracted configuration. This movement towards the rod support first position is made against the tension provided by the tensioner 36 and the rod support biasing element 59.

To extend the tarpaulin 11, the above operations are reversed, movements of the tarpaulin rod 32 toward the aperture second end edge 18 being facilitated by the rod support biasing element 59 and the tensioner 36 at first, and by the tensioner 36 after the tarpaulin rod support 30 has been moved to the rod support second position.

In some embodiments of the invention, although not shown in the drawings, the stopper 26 is omitted and the tarpaulin rod 32 is directly mounted to a caddie 28 movable along the guide 24. Therefore, in such embodiments, there is no pivoting tarpaulin rod support 30.

Although the present invention has been described hereinabove by way of exemplary embodiments thereof, it will be readily appreciated that many modifications are possible in the exemplary embodiments without materially departing from the novel teachings and advantages of this invention. Accordingly, the scope of the claims should not be limited by the exemplary embodiments, but should be given the broadest interpretation consistent with the description as a whole. The present invention can thus be modified without departing from the spirit and nature of the subject invention as defined in the appended claims.

What is claimed is:

1. A device for manipulating a tarpaulin so as to selectively cover and uncover a top aperture of a container, said top aperture defining substantially opposed aperture first and second end edges and substantially opposed aperture first and second side edges extending therebetween, said tarpaulin being configurable between an extended configuration and a retracted configuration, wherein, in said extended configuration, said tarpaulin substantially covers said top aperture, and in said retracted configuration, said tarpaulin is substantially retracted from said top aperture and substantially adjacent said aperture first end edge, said device comprising:
    a guide mountable to said container so as to extend along said aperture first side edge, said guide defining substantially opposed guide first and second ends located respectively substantially adjacent said aperture first and second end edges when said guide is operatively mounted to said container;
    a stopper positioned at a stopping location along said guide;
    a caddie mounted to said guide and movable therealong between said guide second end and said stopping location, said stopper being configured and sized for preventing movements of said caddie away from said guide second end beyond said stopping location;
    a tarpaulin rod support defining a pivot section and a tarpaulin rod supporting section spaced apart therefrom, said tarpaulin rod support being pivotally mounted to said caddie in said pivot section;
    a tarpaulin rod for rolling said tarpaulin therearound when configuring said tarpaulin from said extended configuration to said retracted configuration and for unrolling said tarpaulin therefrom when configuring said tarpaulin from said retracted configuration to said extended configuration, said tarpaulin rod defining a rod longitudinal axis, said tarpaulin rod being rotatably mounted to said tarpaulin rod support in said tarpaulin rod supporting section so as to be rotatable about said rod longitudinal axis, said rod longitudinal axis being substantially parallel to said aperture first end edge when said device is operatively mounted to said container; and
    an actuator operatively coupled to said tarpaulin rod for selectively rotating said tarpaulin rod about said rod longitudinal axis to selectively roll said tarpaulin therearound and unroll said tarpaulin therefrom to respectively move said tarpaulin to said retracted and extended configurations.

2. A device as defined in claim 1, further comprising a tensioner biasing said tarpaulin rod toward said guide second end.

3. A device as defined in claim 2, wherein said tensioner includes a cable rollable around said tarpaulin rod, a tensioner body mountable to said container and a tensioner biasing element extending therebetween, said tensioner biasing element exerting a tension in said cable so that said cable pulls on said tarpaulin rod in a direction leading from said guide first end towards said guide second end, said cable being rolled around said tarpaulin rod when said tarpaulin is unrolled therefrom, and said cable being unrolled from said tarpaulin rod when said tarpaulin is rolled therearound.

4. A device as defined in claim 3, further comprising a pulley mountable to said container for receiving said cable and redirecting said cable while allowing maintenance of said tension in said cable.

5. A device as defined in claim 3, wherein said tarpaulin rod includes a winch drum rotatable jointly therewith defining a drum external surface for receiving said cable thereonto and provided substantially adjacent said tarpaulin rod support, said winch drum having a generally frustro-conical configuration and being provided with an helicoidally-shaped winding groove formed on said drum external surface for substantially fittingly receiving said cable thereonto.

6. A device as defined in claim 3, wherein a sum of an unrolled tarpaulin length of said tarpaulin unrolled from said tarpaulin rod and an unrolled cable length of said cable unrolled from said tarpaulin rod remains substantially constant as said tarpaulin is moved between said extended and retracted configurations.

7. A device as defined in claim 1, wherein said tarpaulin rod support is pivotable between a rod support first position and a rod support second position, said tarpaulin rod support being between said caddie and respectively said guide first and second ends when respectively in said rod support first and second positions.

8. A device as defined in claim 7, further comprising a rod support biasing element extending between said caddie and said tarpaulin rod support and biasing said tarpaulin rod support toward said rod support second position when said tarpaulin rod support is away from said rod support second position.

9. A device as defined in claim 8, wherein said rod support biasing element exerts substantially no biasing force between said caddie and said tarpaulin rod support when said tarpaulin rod support is in said rod support second position.

10. A device as defined in claim 1, wherein said caddie includes a caddie body and at least two wheels each rotatably mounted to said caddie body and rollable along said guide, said guide being received between said wheels so as to substantially prevent movements of said caddie perpendicular to said guide.

11. A device as defined in claim 1, wherein said caddie includes a caddie body and two wheels each rotatably mounted to said caddie body and rollable along said guide, said guide being received between said wheels so as to substantially prevent movements of said caddie perpendicular to said guide.

12. A device as defined in claim 11, wherein said wheels are grooved wheels each defining a circumferential groove and said guide defines opposed edges received in said circumferential grooves.

13. A device as defined in claim 1, wherein said guide is substantially rectilinear.

14. A device as defined in claim 1, further comprising an anchoring block mountable to said container substantially adjacent said aperture second end edge for receiving said tarpaulin rod when said tarpaulin is in said extended configuration.

15. A device as defined in claim 1, wherein said actuator includes a motor mounted to said tarpaulin rod support.

16. A device as defined in claim 1, wherein said stopping location is closer to said guide first end than to said guide second end.

17. An assembly, comprising:
a container defining a top aperture, said top aperture defining substantially opposed aperture first and second end edges and substantially opposed aperture first and second side edges extending therebetween;
a tarpaulin configurable between an extended configuration and a retracted configuration, wherein, in said extended configuration, said tarpaulin substantially covers said top aperture, and in said retracted configuration, said tarpaulin is substantially retracted from said top aperture and substantially adjacent said aperture first end edge; and
a device for manipulating said tarpaulin so as to selectively cover and uncover said top aperture, said device comprising:
a guide mounted to said container so as to extend along said aperture first side edge, said guide defining substantially opposed guide first and second ends located respectively substantially adjacent said aperture first and second end edges;
a stopper positioned at a stopping location along said guide;
a caddie mounted to said guide and movable therealong between said guide second end and said stopping location, said stopper being configured and sized for preventing movements of said caddie away from said guide second end beyond said stopping location;
a tarpaulin rod support defining a pivot section and a tarpaulin rod supporting section spaced apart therefrom, said tarpaulin rod support being pivotally mounted to said caddie in said pivot section;
a tarpaulin rod for rolling said tarpaulin therearound when configuring said tarpaulin from said extended configuration to said retracted configuration and for unrolling said tarpaulin therefrom when configuring said tarpaulin from said retracted configuration to said extended configuration, said tarpaulin rod defining a rod longitudinal axis, said tarpaulin rod being rotatably mounted to said tarpaulin rod support in said tarpaulin rod supporting section so as to be rotatable about said rod longitudinal axis, said rod longitudinal axis being substantially parallel to said aperture first end edge; and
an actuator operatively coupled to said tarpaulin rod for selectively rotating said tarpaulin rod about said rod longitudinal axis to selectively roll said tarpaulin therearound and unroll said tarpaulin therefrom to respectively move said tarpaulin to said retracted and extended configurations.

18. An assembly as defined in claim 17, wherein said container is a vehicle container part of a road vehicle.

19. A device for manipulating a tarpaulin so as to selectively cover and uncover a top aperture of a container, said top aperture defining substantially opposed aperture first and second end edges and substantially opposed aperture first and second side edges extending therebetween, said tarpaulin being configurable between an extended configuration and a retracted configuration, wherein, in said extended configuration, said tarpaulin substantially covers said top aperture, and in said retracted configuration, said tarpaulin is substantially retracted from said top aperture and substantially adjacent said aperture first end edge, said device comprising:
a guide mountable to said container so as to extend along said aperture first side edge, said guide defining substantially opposed guide first and second ends located respectively substantially adjacent said aperture first and second end edges when said guide is operatively mounted to said container;
a caddie mounted to said guide and movable therealong between said guide first and second ends;
a tarpaulin rod for rolling said tarpaulin therearound when configuring said tarpaulin from said extended configuration to said retracted configuration and for unrolling said tarpaulin therefrom when configuring said tarpaulin from said retracted configuration to said extended configuration, said tarpaulin rod defining a rod longitudinal axis, said tarpaulin rod being rotatably mounted to said caddie so as to be rotatable about said rod longitudinal axis, said rod longitudinal axis being substantially parallel to said aperture first end edge when said device is operatively mounted to said container; and
an actuator operatively coupled to said tarpaulin rod for selectively rotating said tarpaulin rod about said rod longitudinal axis to selectively roll said tarpaulin therearound and unroll said tarpaulin therefrom to respectively move said tarpaulin to said retracted and extended configurations.

20. A device as defined in claim 19, further comprising a tensioner biasing said tarpaulin rod toward said guide second end.

\* \* \* \* \*